United States Patent

Menard et al.

Patent Number: 5,690,327
Date of Patent: Nov. 25, 1997

[54] LIFTING SHOE FOR MEDIA HANDLING AND RELATED CASSETTE MEDIA HOLDER

[75] Inventors: Alan W. Menard; Larwence S. Wolfson, both of Bolton; Joseph Conlan, Rocky Hill, all of Conn.

[73] Assignee: Gerber Systems Corporation, South Windsor, Conn.

[21] Appl. No.: 600,889

[22] Filed: Feb. 13, 1996

Related U.S. Application Data

[62] Division of Ser. No. 148,584, Nov. 8, 1993.

[51] Int. Cl.[6] ............................................. B65H 3/46
[52] U.S. Cl. ............................ 271/106; 271/91; 271/92; 271/11; 271/161; 271/3.22; 271/4.01; 271/5; 271/145; 271/14
[58] Field of Search ........................... 271/106, 91, 92, 271/161, 11, 3.22, 4.01, 145, 14

[56] References Cited

U.S. PATENT DOCUMENTS

| | | | |
|---|---|---|---|
| 971,245 | 9/1910 | Cheshire | 271/161 |
| 4,772,006 | 9/1988 | Guglielmetti et al. | 271/106 |
| 5,535,997 | 7/1996 | Croyle et al. | 271/106 |

FOREIGN PATENT DOCUMENTS

| | | | |
|---|---|---|---|
| 4210024 | 9/1993 | Germany | 271/106 |
| 270735 | 11/1990 | Japan | 271/106 |
| 403264431 | 11/1991 | Japan | 271/161 |
| 101937 | 4/1992 | Japan | 271/106 |
| 136839 | 6/1996 | Japan | 271/106 |

*Primary Examiner*—William E. Terrell
*Assistant Examiner*—Khoi H. Tran
*Attorney, Agent, or Firm*—McCormick, Paulding & Huber

[57] ABSTRACT

A system for light-tight handling of a supply of media between a supply station, a workstation and a collecting station, comprises a media handling apparatus defined by a frame and a housing enclosing an internal confine. Within this confine are a supply station and a collecting station disposed at opposite ends of the frame. A positioning drive is suspended above the supply and collecting stations to move media between the supply, collecting and work stations. A lifting shoe is provided as part of the positioning drive and includes a flexible material handling sheet which assumes a first and a second given radius when respectively energized and reverse energized to engage the media supported in curved form. Also, supply and collecting cassettes are provided with a tambour coverings for respectively automatically uncovering and covering the supported media while still maintained in the light-tight confines of the housing.

13 Claims, 10 Drawing Sheets

LIFTING SHOE FOR MEDIA HANDLING AND RELATED CASSETTE MEDIA HOLDER

CROSS REFERENCE TO RELATED APPLICATION

This is a divisional of co-pending application Ser. No. 08/148,584 filed on Nov. 8, 1993 allowed.

This application relates generally to co-pending U.S. application Ser. No. 08/071,567 filed on Jun. 1, 1993, in the name of Wolfson et al. and entitled SYSTEM FOR HANDLING CURVED FORMED MEDIA AND CASSETTE THEREFORE, which application being commonly assigned to Gerber Systems Corporation, the Assignee of the present invention, which application being hereby incorporated by reference.

BACKGROUND OF THE INVENTION

This invention relates generally to improvements to photoplotter equipment, and deals more particularly with improvements made to the media lifting shoe of a material handling apparatus as well as relating to improvements in curved form cassettes and associated devices for uncovering an otherwise closed supply cassette in the light-tight confines of a material handler, and further deals with automatically covering a collecting cassette once imaged media are discharged into it while still maintained within the light impervious confines of the handling unit.

In co-pending U.S. application Ser. No. 08/071,567, discussion is made of handling media of a flexible type, e.g. a photosensitive film, a photosensitive plate, or the like having a relatively thin thickness of approximately on the order of about 0.007 inches, so as to allow the media sheets to conform to a generally partially cylindrical support surface in a plotter. Such curved support surfaces are found in drum-type plotters, such as disclosed in co-pending U.S. patent application Ser. No. 07/839,398 entitled PLOTTER DRUM AND METHODS OF FABRICATION AND ALIGNMENT THEREFORE, filed on Feb. 20, 1992, in the name of Alan Menard et al. involved using a scanning device which images in raster format a media sheet supported on the drum below it. As such, it should be understood that the need to move media onto such a curved support surface involves the handling of media sheets in a curved form so that the media can substantially automatically assume the configuration of the support surface once transported to the support surface during the loading process. Therefore, lifting of the media sheet from a supply of such media to the support surface must be done with this in mind. To these ends, the media is thus maintained in curved form even while stacked in a supply so that individual sheets can be located on the photoplotter drum in a curved condition. In addition, the media sheets involved are photosensitive, in some cases reactant to room light, and therefore must be contained in a light-tight environment even when stored as a supply as well as when being imaged in the photoplotter. Thus, it is important that the means by which media sheets are stored in a light-tight supply container and by which the container is subsequently uncovered via an uncovering process, always protect the light-tight integrity of the container.

Accordingly, it is an object of the present invention to provide an improved media handler of the type which is connectable to pre-existing photoplotter structure and which handler is capable of advancing media sheets from a supply of such media located within the handler to a drum plotter and return the imaged media to the handler without exposure to room light.

It is yet a further object of the invention to provide an improved media handling device of the type wherein media having a flexible form is supported to conform it to the general configuration of the support surface onto which it will ultimately be placed by engaging it with a shoe which is likewise flexible allowing the shoe to conform to the given shape of the media as supported on a support surface.

It is yet a further object of the invention to provide a light-tight media handling system wherein media cassettes are adapted for light-tight storage either as collecting cassettes or supply cassettes, and are capable of being respectively readily covered and uncovered within the handler without hazard of exposure to room light.

Other objects and aspects of the invention will become more readily apparent by the below specification and appended claims.

SUMMARY OF THE INVENTION

The invention resides in a media handling device of the type employing a lifting shoe which depends from a positioning system disposed above a supply of media supported by a frame. The lifting shoe is carried by a movable member depending from and movable by a positioning system along a central axis. The shoe is comprised of a flexible material handling sheet connected to the depending member through lateral side actuator means and vertical actuator means. The vertical actuator means is connected to the material handling sheet to move it between an uppermost position and a lowered position. The material handling sheet has opposite lateral side portions disposed laterally on either side of a central axis such that the lateral side actuator means is connected to the material handling sheet at opposite lateral sides along the central axis. The lateral side actuator means and vertical actuator means when in a first state of energization cause the material handling sheet to assume a first given dimension and when in a second state of energization cause the material handling sheet to assume a second state to energization. The material handling sheet includes holding means disposed threreon for holding media in engagement with the material handling sheet.

The more broad aspects of the invention involve the light-tight handling of a supply of media sheets in a housed light-tight system for movement between discrete supply, collecting and working positions in a work operation. For this purpose, the system includes a material handling apparatus which is supported by a frame and defines thereon a supply station and a collecting station, each contained within the housing. A first cassette is provided and includes a generally arcuate supporting surface for supporting flexible media in stack form. The first cassette has means for selective covering and uncovering media which is contained in it and is capaable of being inserted into a first opening formed in the unit housing, with the first opening including a closure means for closing the first opening to light. Means associated with the first opening and supported by the frame are provided for engaging with the supply cassette and for causing the covering means of this cassette to uncover the media after the first opening is closed by the closure means. A second opening is formed in housing and is associated with the collecting station, with the second opening including a closure means for closing the second opening to light. The second cassette has a collecting area for collecting imaged media thereon. Drive means are provided in association with the second opening and are disposed on the frame and on the collecting cassette for causing covering means to automatically cover the cassette once the second opening is closed by the associated closure means. Alternatively to the use of a collecting cassette, is the provision of a conveyor cassette which is insertable into the second opening so as to engage with the drive means and thereby cause media to be transported out of the apparatus in in a light-tight environment.

DETAILED DESCRIPTION OF THE PREFERRED EMBODIMENT

Figure 1:
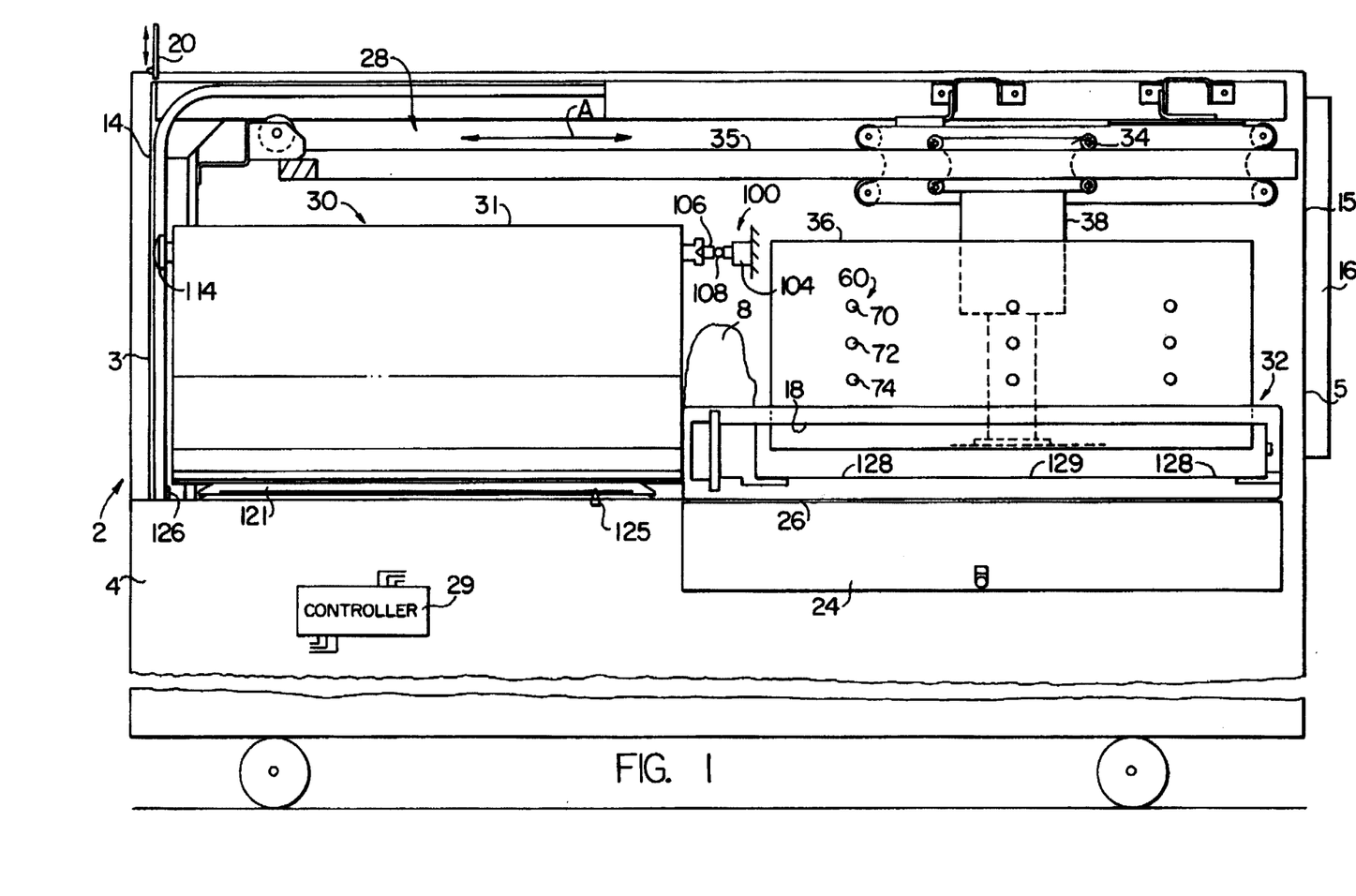
FIG. 1 is a partially fragmentary side elevation view showing the media handler embodying the present invention.
Figure 2:
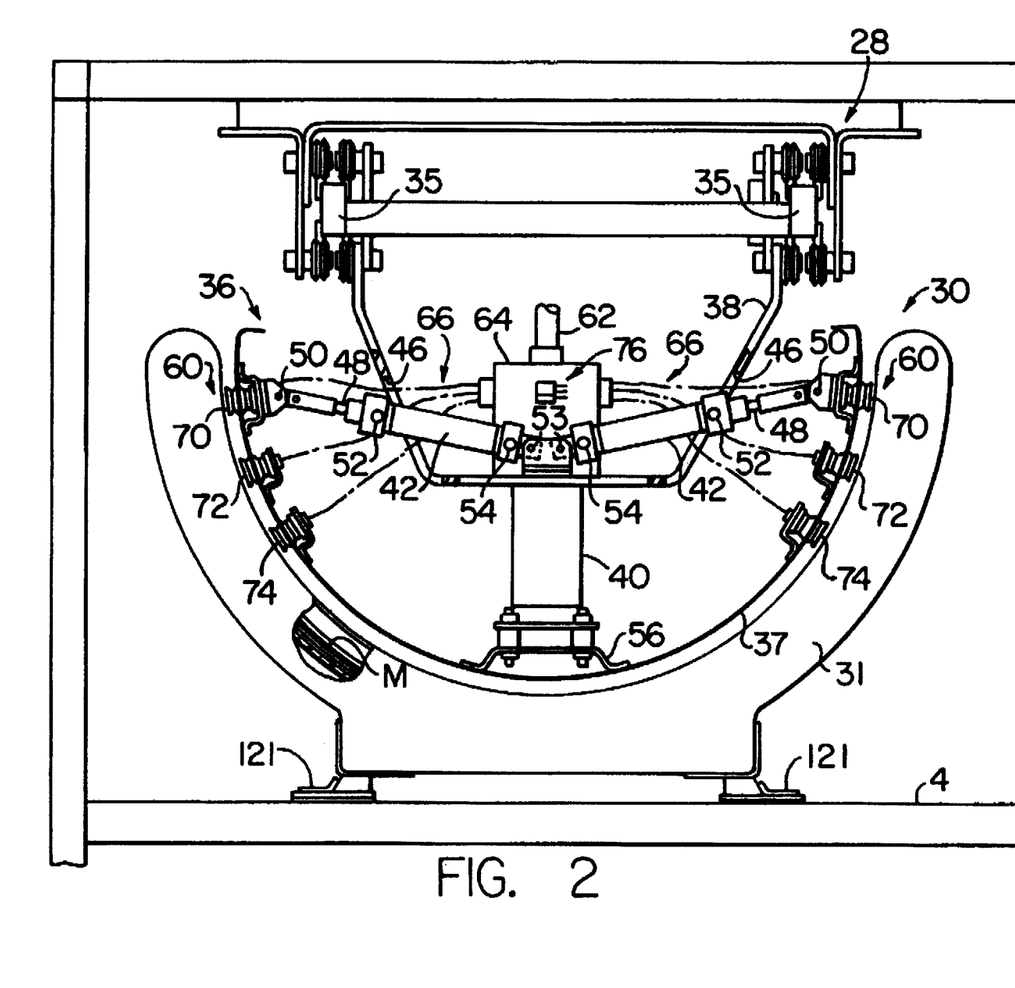
FIG. 2 is a front elevation view of the media lifting shoe located at the supply station as seen from the front of the unit with the loading door up.
Figure 12:
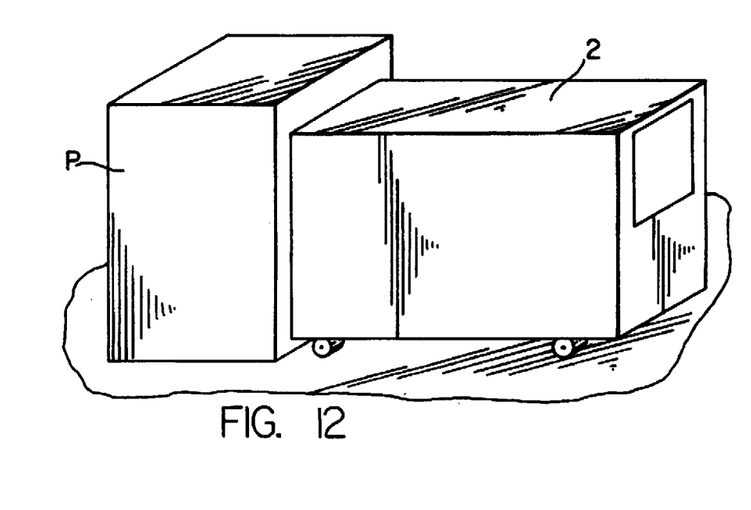
FIG. 12 is a schematic perspective view of a media handling unit embodying the invention and shown in coupled relation with a photoplotter.
Figure 13:
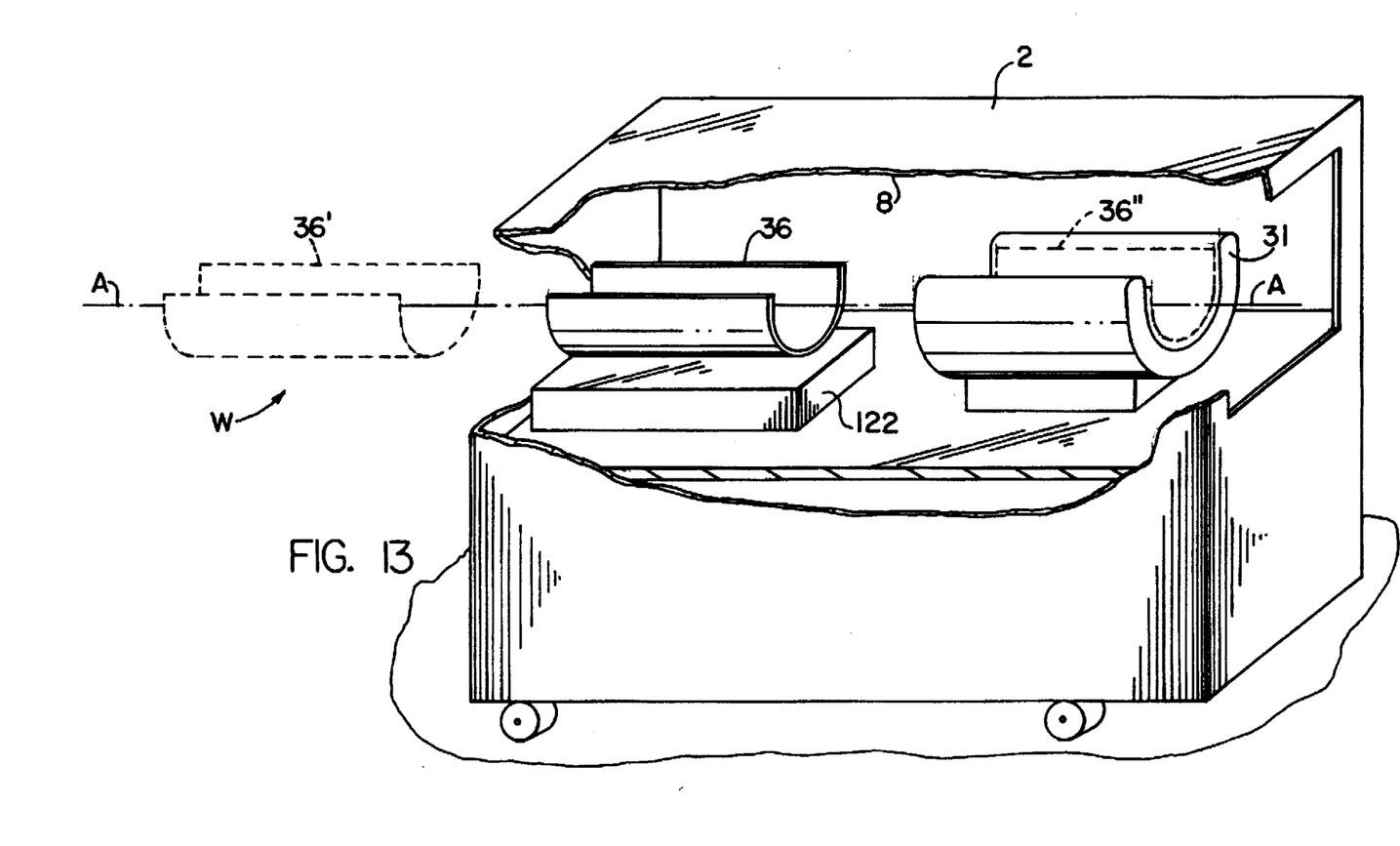
FIG. 13 is a schematic perspective view of the media handling unit of FIG. 12 with portions of the housing broken away to reveal interior components.

FIGS. 1, 2 and 13 illustrate a media handling unit illustrated generally as 2 embodying of the invention. The unit 2 includes a frame 4 which supports the component parts responsible for operating the handling process and a housing 8 covering the frame and the internally disposed parts of the unit. The frame is supported for movement above a floor of, for example, a processing facility, allowing the unit 2 to be rolled into place and coupled to a photoplotter P, as shown in FIG. 12. The frame 4, as seen from above looking in plan view, defines a generally rectangular structure, having its elongate extent defined by opposite end faces 3 and 5 of the housing disposed spatially along a central axis A. The photoplotter may be one such as disclosed in co-pending U.S. patent application Ser. No. 07/839,398 entitled PLOTTER DRUM AND METHODS OF FABRICATION AND ALIGNMENT THEREFOR, which product is sold by Gerber Systems Corporation under the tradename CRESCENT/30. Photoplotters of this type utilize a drum support onto which flexible media M having a thickness on the order of about 0.007 inch is imaged. The relatively thin nature of the imaged media, which for purposes of discussion, includes photosensitive films or plates, allows it to be stored, handled and supported during imaging in curved form.

The unit 2, as seen in FIG. 13, includes basically the housing 8; within the housing 8, a curved media supply cassette 31 and a curved lifting shoe 36 both extending along the axis A; and a media collecting station having a media collecting cassette 122. The lifting shoe is movable along the axis A between the position shown by the solid lines at 36 and the two positions shown in broken lines and indicated at 36' and 36". In the position shown at 36' the lifting shoe is located above the work station of the photoplotter P when the unit 2 is coupled to the photoplotter P as shown in FIG. 12, said work station being indicated at W in FIG. 13. When in the position shown at 36 the lifting shoe is positioned above the collecting cassette 122, and when in the position shown at 36" the lifting shoe is above the supply cassette 31. As explained hereinafter in detail, the lifting shoe includes means for lifting a media sheet from the supply cassette 31 when the shoe is in the 36" position and for then depositing the sheet onto the work station of the photoplotter P after the shoe is moved to the 36' position. The lifting shoe is then retracted to the position shown at 36. Then after the sheet has been exposed by the photoplotter P the lifting shoe is returned to the 36' position, the media sheet is lifted from the photoplotter work station by the shoe, the shoe is returned to the position shown at 36, and the media sheet is then released by the shoe and dropped into the collecting cassette 122.

The media handling unit 2 is covered by the housing 8 against light penetration, but its interior space is nevertheless made accessible by three major closable openings formed in the housing. The first of these openings is provided in the one end face 3 and illustrated as 14. This opening opens to a supply station 30 disposed on the frame 4 for receiving and supporting a supply cassette 31 at this location. A vertically slidable light-tight door 20 is provided in association with the opening 14 and is trained to move vertically within tracks disposed along either side edge of the opening 14. A second opening 18 is formed in one side panel of the housing 8 and opens to a collecting station 32 located generally adjacent the other end face 5 of the housing, which collecting station serves to receive and support a collecting module in the form of either a collecting cassette 122 or collecting conveyor cassette 124. The second opening is covered by a swinging door 24 which is connected to the housing by a hinge 26 extending in the indicated A axis direction. A third opening 15 is formed in the other end face 5 of the housing in line with the A axis and opens to a connecting tunnel 16 through which a media sheet M is transported, and which tunnel end engages the front face of the plotter with a light-tight seal.

The frame 4 supports a positioning drive system 28 above the supply and collecting stations 30 and 32 such that a lifting shoe carriage 36 included as part of the system, is controllably moved along the central axis A to effect handling of a media sheet from the supply station 30 to the coupled photoplotter, and back to the collecting station 32. As discussed in co-pending U.S. patent application No. 08/071,567, the positioning system includes a controller 29 which is linked to system components, such as, drive motors, actuators and sensors, responsible for controlling the movements of the carriage 34 along the A axis. The positioning system also includes a track 35 having a movable length extendible from within the handling unit 2 outwardly thereof and into the coupled photoplotter above the drum support therein. Thus, the lifting shoe carriage 34 is moved along the track 35,35 to locate it at discrete positions therealong corresponding, respectively, to positions immediately over the supply and collecting stations 30 and 32, and above the photoplotter drum.

The lifting shoe carriage 34 carries a depending member 38 to which is attached a flexible lifting shoe 36 controllably movable between vertically and radially retracted and extended positions for the purpose of handling individual media sheets in curved form. To these ends, as illustrated in FIG. 2, the lifting shoe 36 is comprised of a rectangular material handling sheet 37, preferably formed from aluminum, having a thickness equal to about 0.032 inch, and includes a plurality of suction means 60,60 disposed on the outer surface thereof for gripping and holding a media sheet M in place on the handling sheet 37. The lifting shoe further includes a vertical actuator means 40, and two lateral side actuator means 42,42 each of which actuator means being connected between the material handling sheet 37 and the depending member 38. Each of the side actuator means 42,42 and the vertical actuator means is a pneumatically controlled double-acting device and each is controllably moved between extended and retracted positions by the controlled introduction of pressurized air into, for example, inlets 54,54 and 52,52, respectively. One end of each of the side actuators 42,42 connects to the depending member 38 through a pivot connection 53,53 with the opposite ends of which actuators being defined by sliding piston rods 48,48, the free ends of which connect to the back face of the material handling sheet 37 at pivot connections 50,50. The side actuator means 42,42 act through the openings 46,46 formed on either side of the depending member 38 to effect such pivot connections.

The vertical actuator means 40 is connected at its top end to the transom portion of the depending member 38 and connects to the material handling sheet 37 at its lower opposite end through a connecting bracket 56 which is secured to the actuator means 40 with bolts or the like, and is fixed to the handling sheet 37 by a weldement. The vertical actuator means 40 is a two-part assembly, with each part being slidable relative to the other and each is respectively connected to one of the handling sheet 37 and the depending member 38, and is commercially sold by SMC under model number MGQM 32-50-Z805. Also, the energization and reverse energization of the actuator means 40, and 42,42 is controlled by solenoid valves driven by the control unit 29 under a known control scheme.

Vacuum pressure is provided from a vacuum source (not shown) located remotely of the lifting shoe 36 and is introduced to the shoe through a main vacuum line 62 which is connected to the source and attaches to the shoe at the depending member 38. The suction means 60,60 is connected to the main vacuum line 62 through the intermediary of a vacuum parser 64 which is likewise mounted to the member 38 and communicates with the suction means 60,60 through a plurality of local lines 66,66. The local lines 66,66 are connected to discrete rows of suction elements 70,70, 72,72 and 74,74, which rows are arranged in a direction, parallel to the A axis direction on the material handling sheet 37. The material handling sheet 37 is perforated at points coinciding with the placement of the suction elements such that vacuum pressure communicates through the lifting sheet and acts on the confronting media sheet. Each of the suction elements is made from a flexible rubber material and is of a bellows configuration so that upon contact with the media sheet M, the suction member axially collapses thereby drawing the media sheet into a more proximate spatial relationship with the handling sheet 37. The rows 70,70, 72,72 and 74,74 are arranged with respect to each other in pairs symmetrically about the A axis, with the row of each pair corresponding generally to a different width dimension of a media sheet which is contained in the cassette 31 located at the supply station 30. The parser is a multi-valve unit having a selector 76 which is manually set by the operator prior to a handling operation to introduce vacuum to one or all of the row pairs depending on the width of the media to be handled. For example, if a media sheet M of the smallest width is used, then the selector 76 will be set such that only the suction elements of the row pair 74,74 are vacuum energized, but if a media sheet of the largest width is used, then the selector will be set such that the suction elements of each row pair are energized.

As illustrated schematically in FIG. 2, the cassette 31 is supported below the lifting shoe 36 on the frame 4 such that when the shoe is moved to a position in the supply station 30, the suction means 60 of the drum and the supply of media M are in close proximity to one another. In this condition, the handling sheet 37 assumes a first given radius corresponding to the condition where the actuator means 40 and 42,42 are reverse-energized. At this point, vacuum pressure is introduced to the main vacuum line 62 and delivered to the designated ones of the suction means 60,60. In the process of loading media from a supply contained in the cassette 31, the vertical actuator means 40 is first energized causing the handling sheet 37 to move downward into engagement with the topmost media sheet supported in the cassette 31. Thereafter, the side actuators are energized to move the upwardly turned end portions of the lifting sheet 37 radially outwardly and thus cause the suction means 60,60 to be brought into engagement with the media. In this condition, the lifting sheet 37 assumes a second given radius corresponding to that assumed by the topmost media sheet in the supply contained in the cassette 31. By way of illustration, the support surface provided by the supply cassette 31 has a radius of curvature of about 10.5 inches as taken from the center of curvature R. The control unit 29 interrogates vacuum pressure sensors disposed in the local lines 66,66 to determine whether all the designated suction elements are sealed by engaging with the media, and will issue an error condition if an open vacuum circuit is detected. If no such error condition is found to exist, then the side actuator means 42,42 are reverse-energized followed by the reverse energization of the vertical actuator means 40 thereby lifting the involved media sheet from the cassette. Transport of the now held media sheet to the photoplotter is effected in the manner discussed in the aforementioned co-pending U.S. application Ser. No. 08/071,567 filed on Jun. 1, 1993, in the name of Wolfson et al. and entitled SYSTEM FOR HANDLING CURVED FORMED MEDIA AND CASSETTE. Once over the drum support in the photoplotter, vacuum is applied to the drum surface and the actuator means are energized to articulate the handling sheet 37 to its second given radius in the manner discussed above. Vacuum is thereafter stopped to the main line 62 thereby allowing the media to be freely held by the drum support of the photoplotter. The lifting shoe carriage 34 and the track extension are thereafter retracted from the photoplotter, and imaging of the media then occurs. After imaging, the carriage 34 is returned to within the photoplotter and pick-up of the imaged media is effected in the same manner discussed above with reference to the pick up of media in the supply cassette, only that the vacuum to the drum in the photoplotter is stopped before lifting of the media occurs. The lifting shoe carriage 34 with the held exposed media are then moved to the discharge station where they are positioned over a cassette 122 or a conveyor cassette 124, whereupon the media sheet is dropped either by stopping vacuum to the main vacuum line 62, or first articulating the handling sheet to its second given radius and then stopping vacuum. The process is then repeated with the moving of the lifting shoe carriage 34 into the start position above the supply cassette 31.

Figure 3:
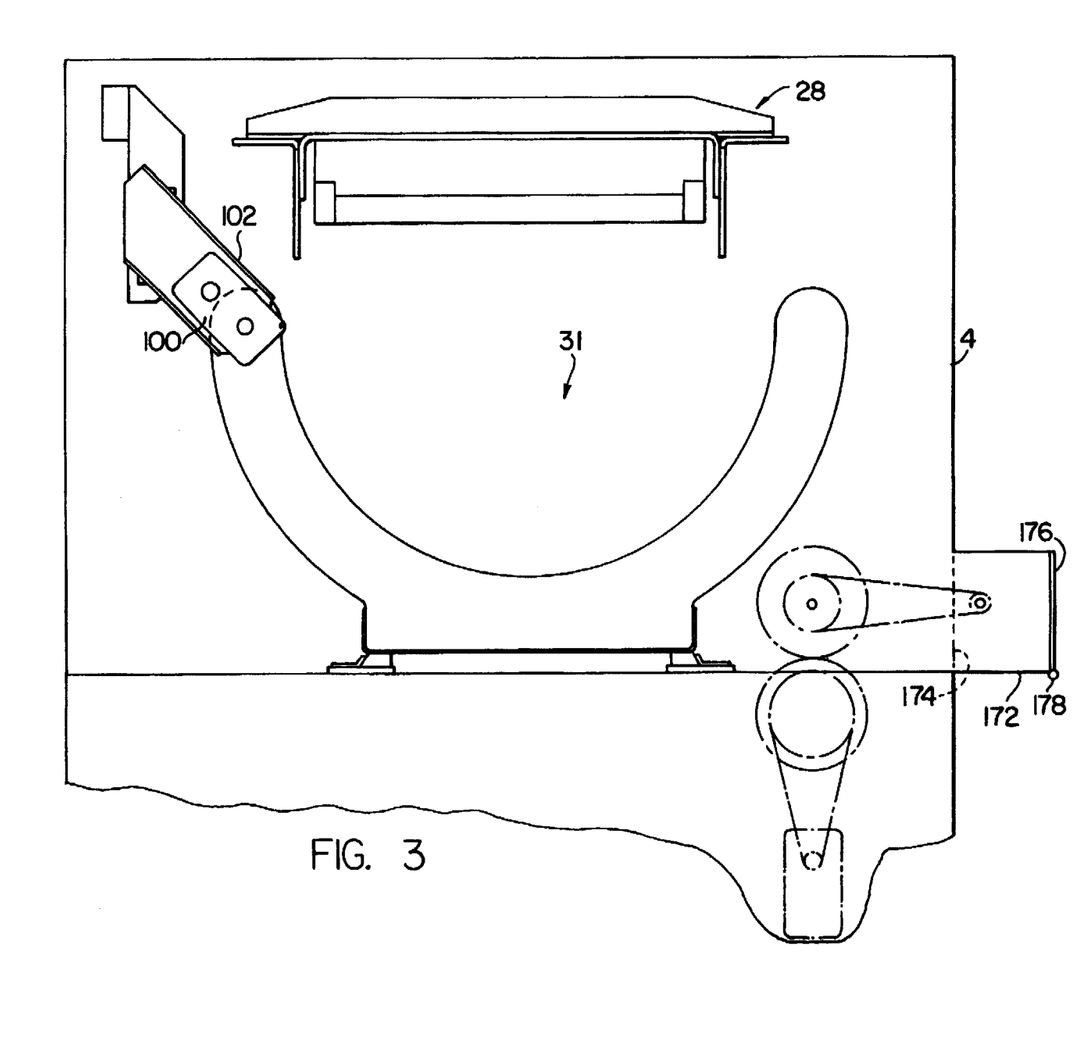
FIG. 3 is a rear elevation view of the apparatus shown in FIG. 1 showing schematically the cassette uncovering drive mechanisms.
Figure 4:
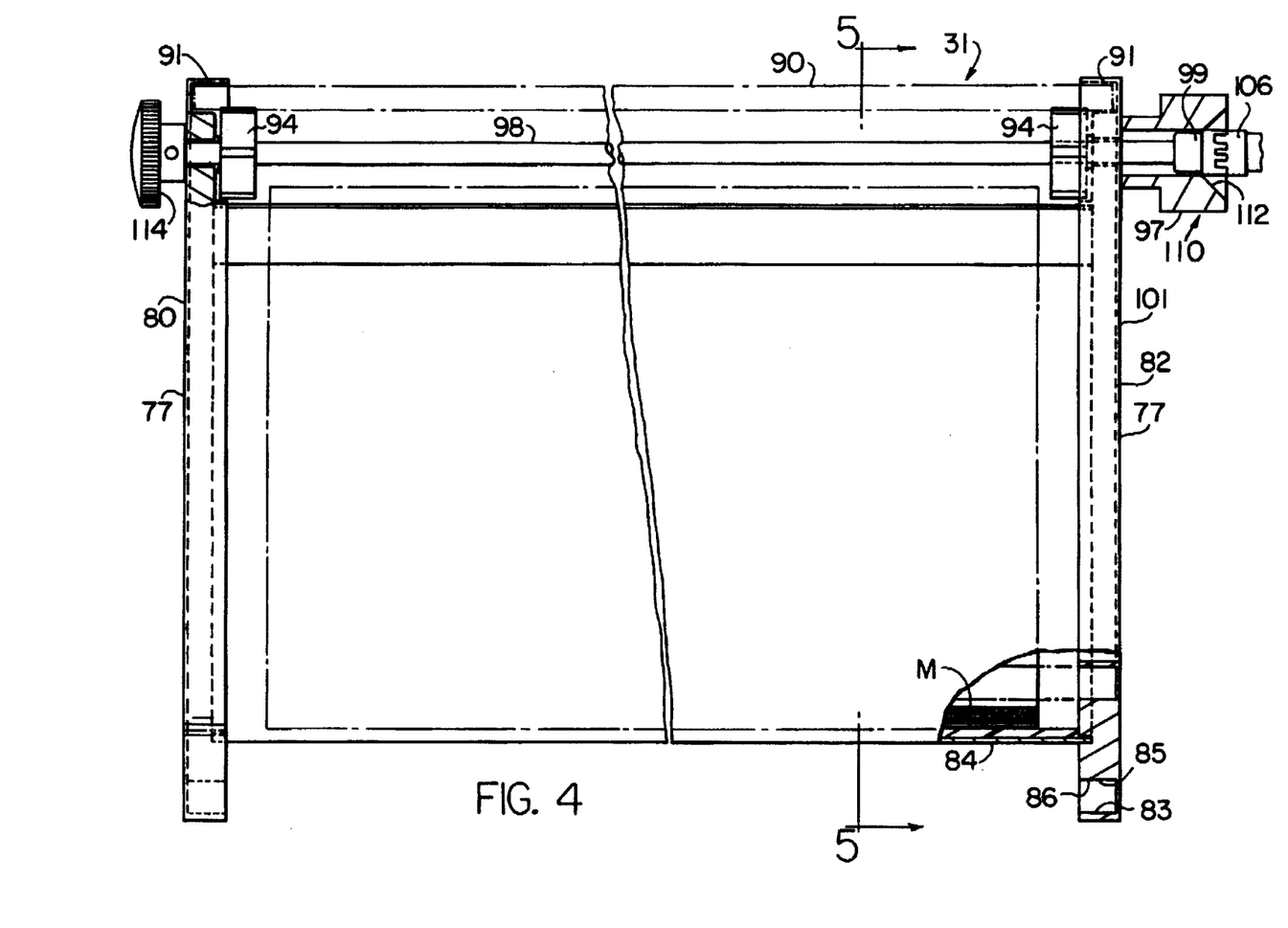
FIG. 4 is a side elevation partially fragmentary view showing the supply cassette apart from the handling apparatus.
Figure 5:
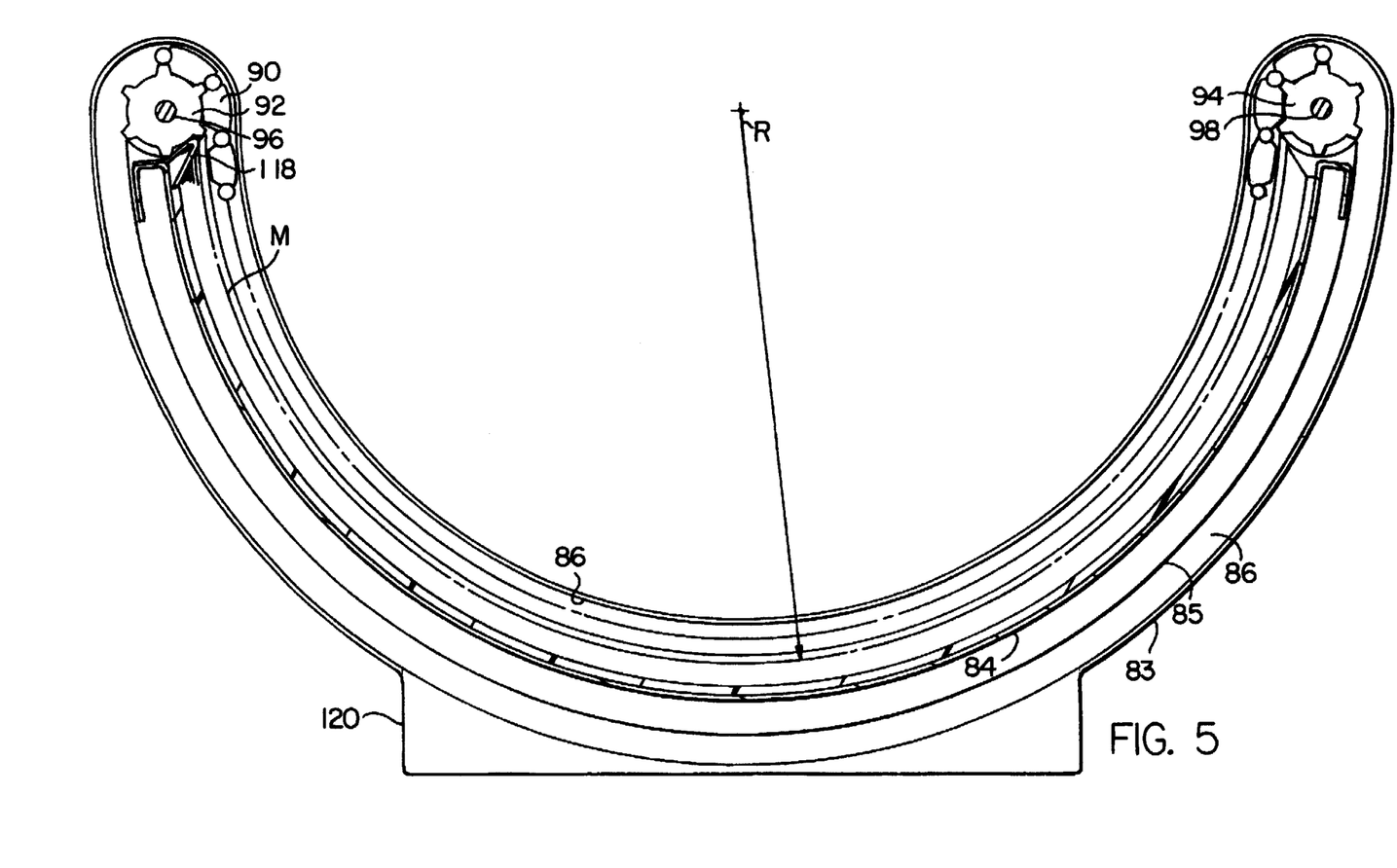
FIG. 5 is a partially fragmentary front end view of the cassette shown in FIG. 4 taken along line 5—5.

Referring now to FIGS. 3–5, and to the supply cassette in particular, it should be seen that the supply cassette 31 is comprised of first and second end caps 80 and 82 each being defined by an end cover plate 77,77 connected lengthwise together by a sheet of rigid material 84, such as, aluminum, defining the shell of the cassette. The stack of media which comprise the supply rests on the upper surface of the shell 84 and are centered relative to the central axis A by end pieces 118,118 which adjustably connect to the shell along opposite side edges of the stack of media sheets. The end caps each include a base portion 120 which is correspondingly sized and shaped to be received within ways 121,121 secured to the frame 4 and extending in the indicated A axis direction. These ways insure the proper seating of the cassette laterally relative to the A axis. Formed as part of each of the end caps 80 and 82 is an inner lip 85 and an outer lip 83 which are spaced from one another to define with the cover plate 77,77 a track 86 therebetween opening to the interior confines of the cassette and surrounding the juncture where each end of the shell 84 connect to the respective ones of the end cover plates 77,77 of each end cap. A tambour covering is provided and extends across the cassette between the opposed cover plates 77,77 such that the marginal side edge portions 91,91 thereof are received within each track 86,86 of the two end caps 80 and 82. The tambour cover is commercially sold by ROTALAC under model No R-2342. Rotatably journalled within each of the upwardly turned end portions of the end caps 80,82 are two sprockets 92 and 94 which are commonly drivingly connectingly to the corresponding sprockets of the opposed end cap 80,82 by shafts 96 and 98 which extend therebetween the entire length of the cassette. The sprockets 92 and 94 are so journalled on the end caps as to interrupt the otherwise continuous inner lip 85,85 of the track 86 so as to project beyond this lip and engage between the hinged units which make up the cover 90. As such, a driving connection is achieved between the cover 90 and the sprockets 92 and 94.

As illustrated in FIG. 4, the cassette 31 has a leading edge 101 which includes an engagement means 110 for drivingly coupling with the shaft 98 to uncover the cassette. The means 110 includes for this purpose an interdigitating end piece 99 formed on the proximate end of the shaft 98, a locating collar 97 connected for rotation with the shaft 98 and a frustoconical opening 112 formed in the front face of the collar to effect proper seating of a correspondingly interdigitated drive piece 106 which is part of a drive means 100 mounted to the frame 4 by a bracket 102. This means includes an A.C. drive motor 104, an appropriate gear drive mechanism drivingly connected to the motor and including a drive output, and a flexible coupling member 108 connected between the drive motor output and the drive drive piece 106. The drive means 100 is mounted to the frame 4 so as to orient the drive member 106 in substantial parallel relationship with the axis A. This is important because the cassette 31 is loaded into the handling unit 2 through the opening 14, after the door 20 has been raised, and is pushed along the ways 121 in the direction of the A axis until the cassette locks in place through the action of a spring biased detent 125 secured to the frame 4 and coacting with a recess formed on the lower surface of the cassette 31. The location of the detent 125 is such that locking occurs coincidentally with the engagement of the interdigitated parts 106 and 99. The mating of these parts is aided by the somewhat compliant characteristic of the flexible coupling 108.

In use, a covered cassette 31 with a supply of media M contained in it is loaded into the handling unit 2 until locking by the detent 125 is achieved. Media may be loaded in a dark room, for example, and thereafter the cassette 31 is covered using a manual knob 114 to move the cover back to its home position. In its covered condition, the cover 90 extends non-interruptedly between the sprockets 92 and 94 such that when the sprocket 94 is rotated in the clockwise direction, the length of the cover 90 is driven past it, and is maintained within the length of the track 86 disposed most radially outwardly of the center of curvature R. With the cassette 31 now positioned within the handling unit 2, the door 20 is closed and its closure is checked by the controller 29 against a sensor 126 disposed on the frame 4 and provided for this purpose. Once closure of the door is sensed and confirmed, the controller 29 then causes the drive means to be activated, thus causing the shaft 98 through its engagement with the drive part 106 to be rotated in a clockwise direction to uncover the otherwise enclosed media. Disposed on the outer surface of the cover 90 at its trailing end, i.e. the end associated with the sprocket 92, is a magnetic piece which is moved along with the cover during the uncovering process past a sensor located adjacent the right sprocket 94. The controller 29 through interrogating this sensor, stops the drive motor 104 upon sensing the magnet at the point where the cassette 31 is uncovered.

It is a feature of the invention to provide a collecting cassette station which can cover or transport imaged media sheets from within the light-tight confines of the unit outwardly without being accidentally exposed to stray light. To these ends, the frame 4 supports a substantially planar horizontally disposed receiving surface 129 associated with the collecting station 32 having two parallel spaced guide members 128,128 disposed thereon. These guide members receive correspondingly sized and shaped ways 127,127 disposed as a pair along the bottom surface 131 of each of the collecting cassette 122 and conveyor cassette 124. In this way, each of the cassettes 122 and 124 is maintained in a substantially horizontal disposition while supported by the frame 4 within the unit.

Figure 6:
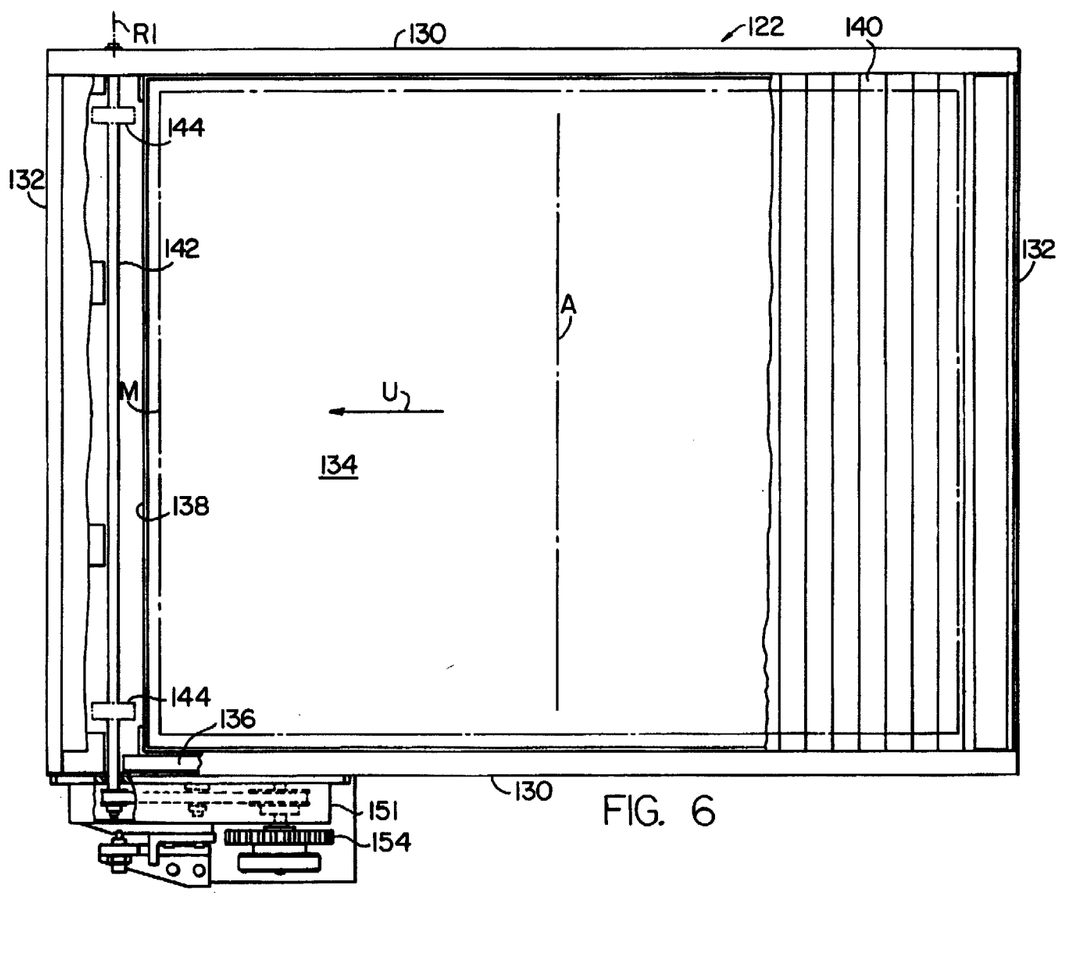
FIG. 6 is a partially fragmentary top plan view of a collecting cassette.
Figure 7:
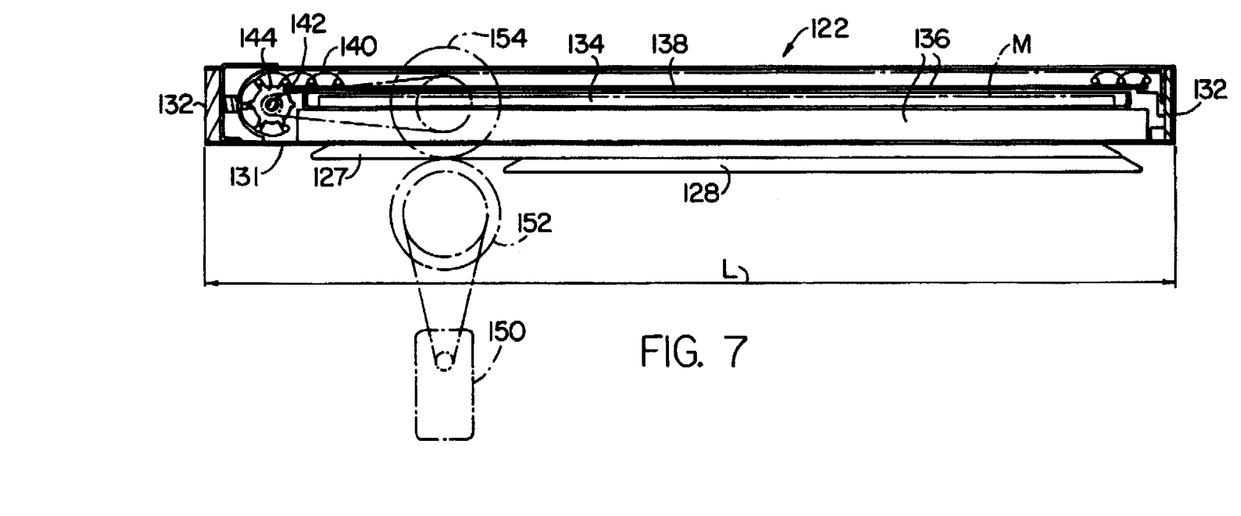
FIG. 7 is a front vertical view showing a collecting cassette as supported within the handling apparatus.

Referring first to the collecting cassette 122 as an alternative for use at the station 32, it should be seen that the collecting cassette as shown in FIGS. 6 and 7 is a generally rectangular member having long sides 130,130 which extend orthogonally to the central axis A and has short sides 132,132 extending in a direction parallel to the axis A. The long and short sides 130 and 132 are connecting at right angles to create a collecting area 134 within the cassette to contain media sheets M which are dropped from the lifting shoe 36 in a manner which is discussed above. The collecting area 134 is defined by a collecting tray 138, which is supported by the opposed long sides 130,130 approximately mid-height of the cassette. Disposed on opposite top and bottom sides of the collecting tray 138 on the opposed long sides 130,130 of the cassette 122 is a track 136,136 extending in a direction orthogonally to the longitudinal axis A of the media handler. Each track receives associated marginal side edge portions of a tambour covering 140 which is received within the track 136 for movement of the covering in the uncovering direction U. To effect such uncovering, a drive shaft 142 is provided and is journalled at its opposite ends in the opposed long side walls 130,130 for rotation about the indicated axis R1. Disposed at spaced intervals along the length of the drive shaft 142 are two sprockets 144,144 having teeth that engage between the hinge linkages of the individual tambour units.

Figure 10:
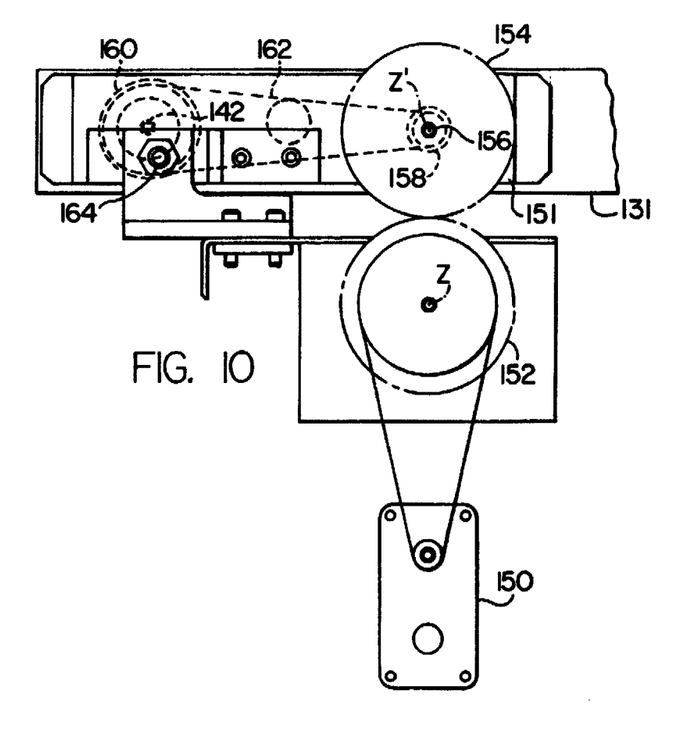
FIG. 10 is a partially fragmentary side elevation view of the drive mechanism provided on the cassettes shown in FIGS. 6 and 8.
Figure 11:
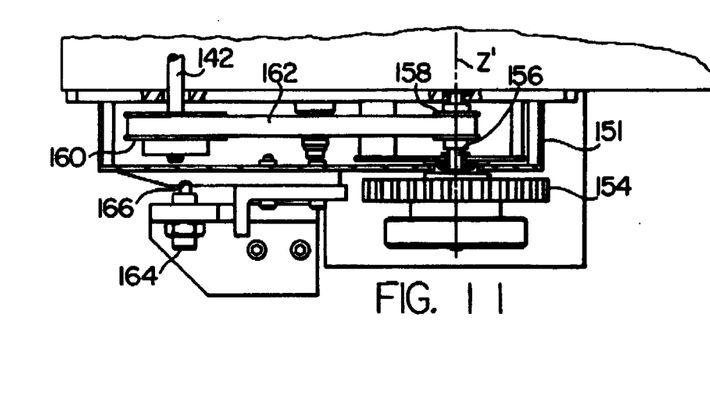
FIG. 11 is a top view of the mechanism shown in FIG. 10.

It is a feature of the invention as illustrated in FIGS. 10 and 11, to provide a means by which the tambour cover 140 of the collecting cassette 122 can be moved to cover the collecting area 134 after the exposed media sheets have been discharged to the collecting station and while the handling unit remains impervious to light. This means includes a drive motor 150 supported by the frame 4 and connected to a drive gear 152 mounted to the frame 4 for rotation about the indicated axis Z, which, in the illustrated embodiment, extends parallel to the main axis A of the unit. Each collecting cassette 122 or conveyor cassette 124 includes a supporting drive structure 151 containing a complementary driven gear 154 which is nonrotatably mounted to a primary driven shaft 156 freely rotatably journalled in the outer wall of the proximate one of the long side walls 130,130 and within the structure 151 for rotation about a second axis Z'. Disposed non-rotatably about the primary shaft 156 is a first toothed pulley 158 which is drivingly rotatably coupled to the shaft 142 through the intermediary of a second toothed pulley 160 and a toothed belt 162.

The drive gear 152 is positioned below the lower surface 131 of the cassette 122 or the cassette 124 and the driven gear 154 so as to automatically intermesh the gear teeth of the driven gear 154 when the cassette 122 or the cassette 124 is inserted through the opening 18 in a direction transversely to the longitudinal axis A of the media handler. The then intermeshed gears 152 and 154 are caused to remain in an engaging condition by a spring operated detent 164 which is caused to engage in a corresponding recess 166 formed in the drive structure 151.

Figure 8:
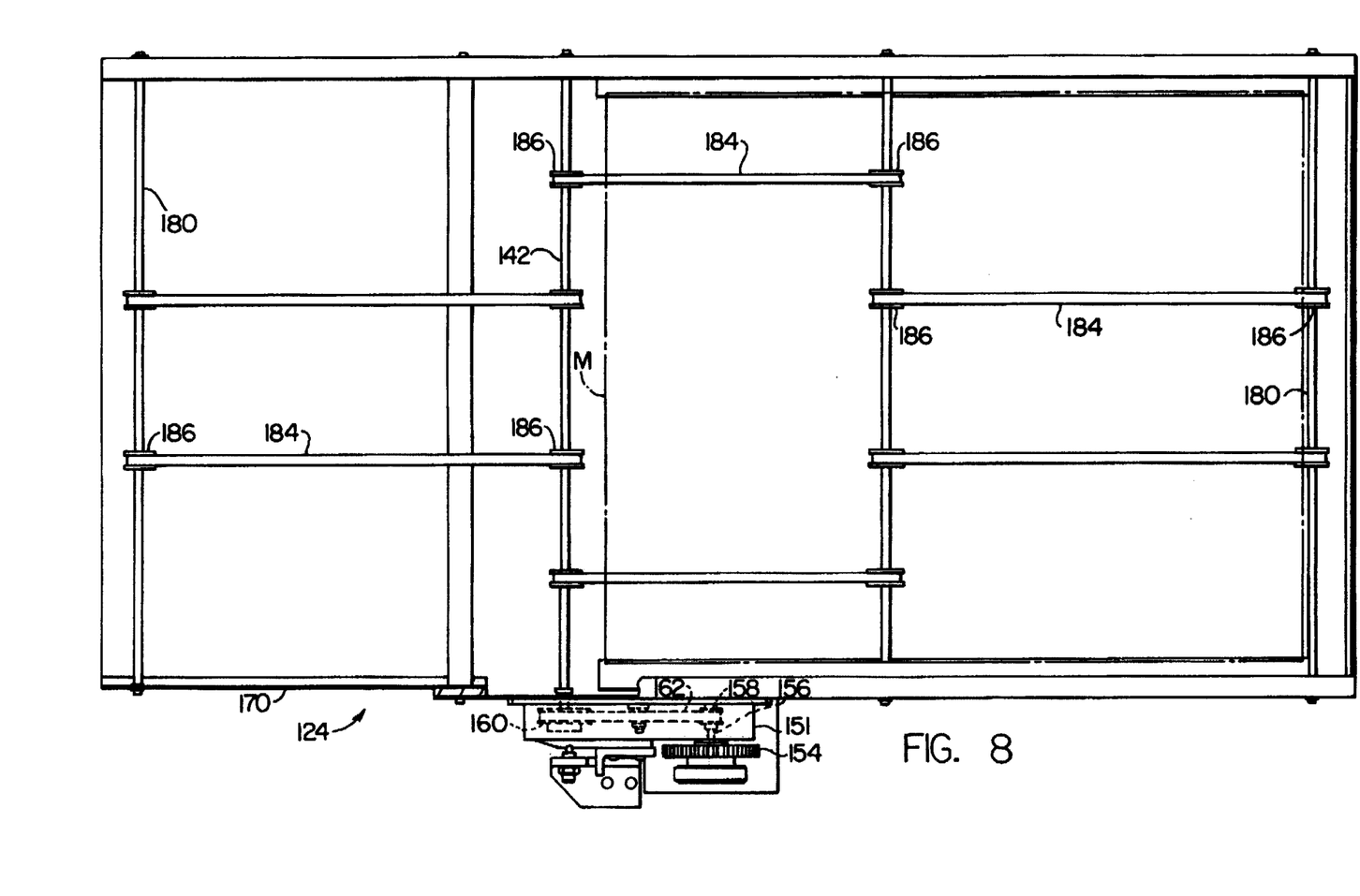
FIG. 8 is a partially fragmentary top plan view of a conveyor cassette which may be used alternatively to the cassette shown in FIG. 6.
Figure 9:
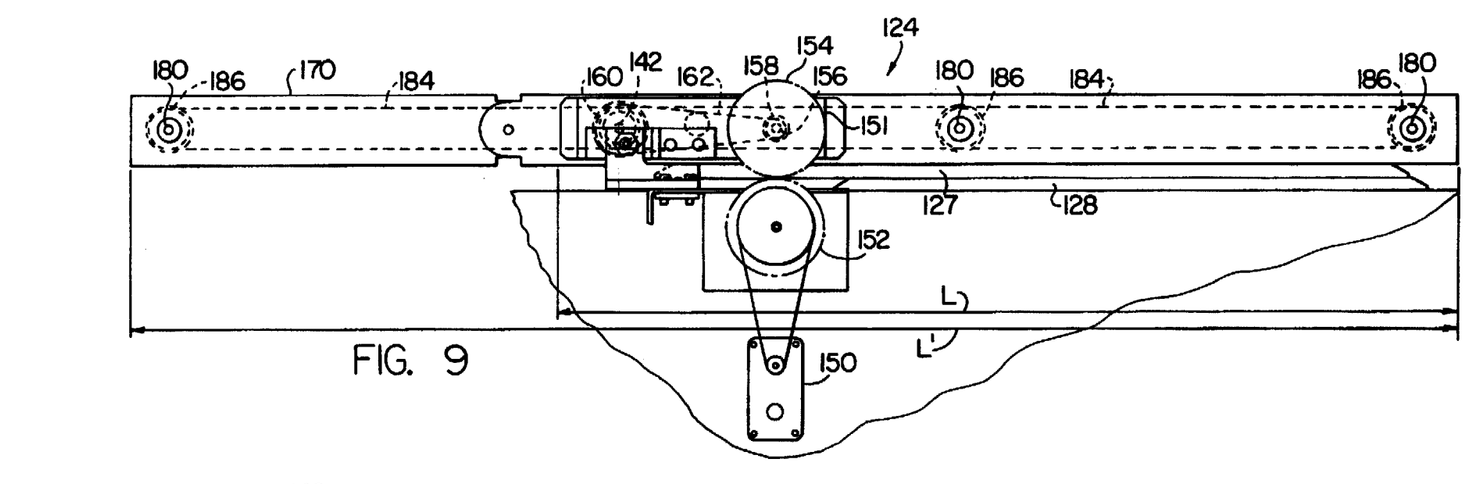
FIG. 9 is a front vertical view of a conveyor cassette of FIG. 8 shown inserted within the apparatus of FIG. 1.

Referring back to FIGS. 8 and 9, and in particular to the conveyor cassette 124 which may be used in place of the standard cassette 122, it should be seen that the conveyor cassette 124 is inserted into the handler unit in the same way as discussed with respect to the collecting cassette 122, but that the conveyor cassette 124 differs in its length L' which exceeds that length L of the collecting cassette by an amount equal to approximately the length of an extension part 170. The extension part 170 is provided for the purpose of using the conveyor cassette in conjunction with an automated processor which moves the developed media off the part 170 and onto a section of conveyor in a light-tight tunnel. As best illustrated in FIG. 3, the side panel of the unit opposite that in which the opening 18 is formed, further includes an encasement box 172 which is sealingly attached to the outer surface of the involved side panel of the housing 8. The box covers a fourth opening 174 formed in the side panel of the unit with the containment box 172 itself comprising a light tight door 176 which is hingedly connected at 178 to swing in a vertical direction between an open and the illustrated close position. It should be seen that the conveyor cassette 124 does not utilize a tambour cover, but instead comprises a plurality of transversely extending idler shafts 180,180 which are drivingly coupled to one another by a system of support belts 184,184 nonrotatably connected to the primary shaft 142. The primary shaft 142 is driven in a similar manner discussed with reference to FIGS. 10 and 11 by the drive means 150. Power transmissions between the primary shaft 142 and the remaining transverse idler shafts 180,180 is effected through the plurality of support belts 184,184 trained about pulleys 186,186 which are non-rotatably secured to respective ones of the drive shafts 142 and 180,180. It is the support belts 184,184 which themselves are responsible for conveying the media out of the unit 2.

In use, either the collecting cassette or the conveyor 124 is inserted into the opening 18 and the light tight door 24 is then closed behind it. In the case where the conveyor cassette is used, the door 176 must first be open to allow the extension part 170 of the conveyor cassette to protrude outwardly of the handling unit. The length of the cassette is approximately 36.5 inches, whereas the length of the conveyor cassette is about 58.3 inches with the difference between the length L and the length L' being sufficient to extend the end of the conveyor cassette outwardly of the unit. In the case where the conveyor cassette is used, the containment box 172 is connected with an appropriate tunnel of an automated processor to complete the light-tight integrity of the machine. Thereafter, a plotting operation commences with the result being that the media M is sequentially moved and developed from the supply station 30 and deposited at the collecting station 32. Depending on the type of collecting cassette used, i.e. whether a collecting cassette 122 or the conveyor type 124 is used, the drive means 150 is either continuously activated in the case of the conveyor type 124 or is controllably energized by the controller 29 after a job is completed to cause the drive gear 152 to rotate in a counterclockwise direction thereby causing rotation of the drive sprockets 144,144 in a clockwise direction to move the tambour cover 140 to a covering condition from its otherwise uncovered condition where the tambour cover is maintained below the tray 138.

By the foregoing, a system for handling media in a light-tight environment is disclosed by the way of preferred embodiment. However numerous modifications and substitutions may be had without departing from the spirit of the invention. For example, the spacing between the suction elements 60,60 of the flexible shoe may be varied in arrangement and in size depending on the application of the media at hand.

Accordingly, the application has been described by way of illustration rather than limitation.

We claim:

1. A media sheet handling device comprising:

a frame, a supply cassette supported by said frame for holding a supply of media sheets, and a positioning system disposed above said supply cassette for moving media sheets one at a time from said supply cassette to a remote location spaced from said supply cassette, said positioning system including a carriage movable along a central axis from said supply cassette to said remote location, a member carried by and depending from said carriage;

a handling shoe in the form of a flexible handling sheet connected to said depending member through lateral side actuator means and vertical actuator means;

said vertical actuator means being connected to said handling sheet to move said handling sheet between an uppermost position and a lowered position relative to said depending member;

said handling sheet having opposite lateral sides disposed laterally on either side of said central axis, said lateral side actuator means being connected to said handling sheet at said opposite lateral sides thereof;

said lateral side actuator means and said vertical actuator means when in a first state of energization causing said handling sheet to assume a first given radius and when in a second state of energization causing said handling sheet to assume a second given radius; and holding means disposed on said handling sheet for holding a media sheet in engagement with said handling sheet.

2. A media sheet handling device as defined in claim 1 wherein:

said lateral side actuator means includes first and second actuators pivotally connected to said depending member and to said lateral sides of said handling sheet.

3. A media sheet handling device as set forth in claim 2 wherein:

said holding means includes a plurality of vacuum gripping members disposed in spaced relationship in gripping member rows along the length of said handling sheet; and each of said gripping member rows corresponds in location respectively with the positions taken by the lateral side ends of media sheets of differing width.

4. A media sheet handling device as set forth in claim 3 wherein:

said holding means includes a vacuum source connectable to said gripper members through a vacuum parser which is settable to introduce vacuum to selected ones of said gripper member rows.

5. A media sheet handling device as set forth in claim 4 wherein:

said device further comprises a control means controlling the sequential actuation of said first and second lateral actuators and said vertical actuator such that said vertical actuator moves to a lowered position prior to the second state actuation of the first and second lateral actuators.

6. A media sheet handling device as defined in claim 1, wherein:

said supply cassette holds said media sheets in curved form and includes a first end cap and a second end cap each of which first and second end caps is defined by a cover plate and inner and outer lips together defining a track therebetween opening to the interior confines of the cassette and having first and second free ends;

said first and second end caps each being connected to one another by a sheet of rigid material defining the shell of the cassette, said shell interconnecting said first and second end caps to one another;

said shell offering at least one curved support surface on which media sheets are supported;

a tambour cover received within said tracks of said first and second end caps and extending entirely therebetween; and means rotatably disposed at the first and second free ends of said end caps such that the tambour cover is trained around each of said means to allow movement of the tambour cover along said tracks from a covering condition to a non-covering condition.

7. A media sheet handling device as defined in claim 6 wherein:

said means disposed in the free ends of each of said first and second end caps includes four sprockets each located at a respective one of said free ends and engaging said tambour cover, a first shaft carrying the two of said sprockets at said first free ends of said end caps, and a second shaft carrying the two of said sprockets at said second free ends of said end caps.

8. A media sheet handling device as defined in claim 7 further comprising:

means supporting said supply cassette for movement relative to said frame between installed and removed positions, and a drive part supported by said frame for driving cooperation with said supply cassette, said first drive shaft connecting the drive sprockets in said first free ends of said first and second end caps having a leading end defined by a coupling part which coupling part interdigitatably couples with said driven part as said supply cassette is moved from said removed to said installed position.

9. A media sheet handling device as defined in claim 7 wherein:

said shell of the supply cassette includes end pieces which cause the end edges of the media sheets to stack in alignment with one another while supported by the supply cassette.

10. A media handling system as defined in claim 1, further comprising:

a collecting cassette for collecting imaged media sheets from said positioning system, said collecting cassette including a tray having first and second dimensions, first and second opposed side walls spaced from one another by said first dimensions of said tray, third and fourth opposed side walls spaced from one another by said second dimension of said tray, said first and second side walls each including track means extending along the length thereof for receiving the marginal side edges of a cover means, said cover means being received in the track means of said first and second side walls so as to extend between said third and fourth side walls to cover said tray from stray light, and drive means associated with one of said first and second side walls and being connected to said cover means to cause movement of the cover means over said tray to effect covering of exposed media sheets received in said cassette.

11. A media handling system as defined in claim 1 further comprising:

a conveying cassette having first and second given dimensions for receiving imaged media sheets from said positioning system, first and second opposed side walls spaced from one another by the first given dimension of said cassette, said first and second opposed side walls being connected at opposite ends to third and fourth opposed side walls separated from one another by said second given dimensions of said cassettes, and conveyor means associated with each of said opposed first and second side walls for movably supporting a media sheet, said conveyor means being operable to advance media sheets placed thereon by said positioning system to a position located outwardly of said media handler.

12. A media handling system as defined in claim 11, wherein:

said conveyor cassette includes an extension part located adjacent said fourth side wall of said conveyor cassette, and said conveyor means includes a system of drive belts non-rotatably disposed on a plurality of idler shafts journalled in each of said first and second side walls.

13. A media handling system as defined in claim 12 wherein:

said conveyor means includes a drive means associated with one of said first and second side walls, and said drive means includes a drive input means for inputting power from an external drive source.

* * * * *